United States Patent
Xiong et al.

(10) Patent No.: US 9,584,589 B2
(45) Date of Patent: Feb. 28, 2017

(54) FRIEND RECOMMENDATION METHOD, APPARATUS AND STORAGE MEDIUM

(71) Applicant: TENCENT TECHNOLOGY (SHENZHEN) COMPANY LIMITED, Shenzhen, Guangdong (CN)

(72) Inventors: Pengfei Xiong, Shenzhen (CN); Chaowei Li, Shenzhen (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 699 days.

(21) Appl. No.: 14/051,382

(22) Filed: Oct. 10, 2013

(65) Prior Publication Data

US 2014/0053087 A1  Feb. 20, 2014

Related U.S. Application Data

(63) Continuation of application No. PCT/CN2012/076861, filed on Jun. 13, 2012.

(30) Foreign Application Priority Data

Sep. 19, 2011  (CN) .......................... 2011 1 0278327

(51) Int. Cl.
*G06F 17/30* (2006.01)
*H04L 29/08* (2006.01)
(Continued)

(52) U.S. Cl.
CPC ............. *H04L 67/10* (2013.01); *G06Q 10/10* (2013.01); *G06Q 50/01* (2013.01)

(58) Field of Classification Search
USPC ................ 707/607, 609, 687, 705, 790, 821
See application file for complete search history.

(56) References Cited

U.S. PATENT DOCUMENTS

2004/0044677 A1   3/2004  Huper-Graff et al.
2009/0299998 A1*  12/2009 Kim .................. G06F 17/30864
(Continued)

FOREIGN PATENT DOCUMENTS

| CN | 101968818 A | 2/2011 |
| CN | 102035891 A | 4/2011 |
| CN | 102164315 A | 8/2011 |

OTHER PUBLICATIONS

International Search Report in international application No. PCT/CN2012/076861, mailed on Sep. 20, 2012.
(Continued)

*Primary Examiner* — Sana Al Hashemi
(74) *Attorney, Agent, or Firm* — Oppedahl Patent Law Firm LLC

(57) ABSTRACT

Disclosed is a friend recommendation method, comprising: creating a recommendation backlist for a user; deleting a recommended object included in the recommendation backlist of the user from a recommended object list; and recommending remaining recommended objects in the recommended object list to the user. The present application further discloses a server and a storage medium, so as to recommend friends based on the requirements of a user and recommend objects that the user is really interested in. Therefore, the accuracy and efficiency of friend recommendation are improved, friends can be recommended effectively and the user experience is enhanced.

14 Claims, 2 Drawing Sheets

(51) Int. Cl.
*G06Q 10/10* (2012.01)
*G06Q 50/00* (2012.01)

(56) References Cited

U.S. PATENT DOCUMENTS

2010/0057858 A1   3/2010  Shen et al.
2012/0159337 A1*  6/2012  Travilla ............. G06Q 30/0631
                                                                       715/738

OTHER PUBLICATIONS

English Translation of the Written Opinion of the International Search Authority in international application No. PCT/CN2012/076861, mailed on Sep. 20, 2012.

* cited by examiner

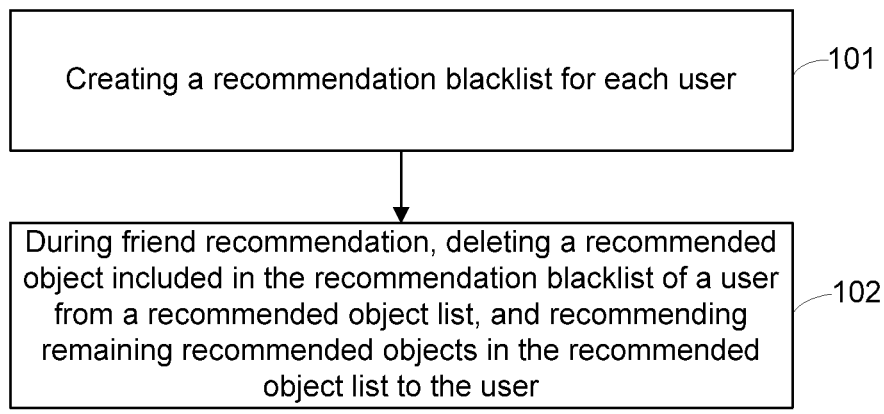
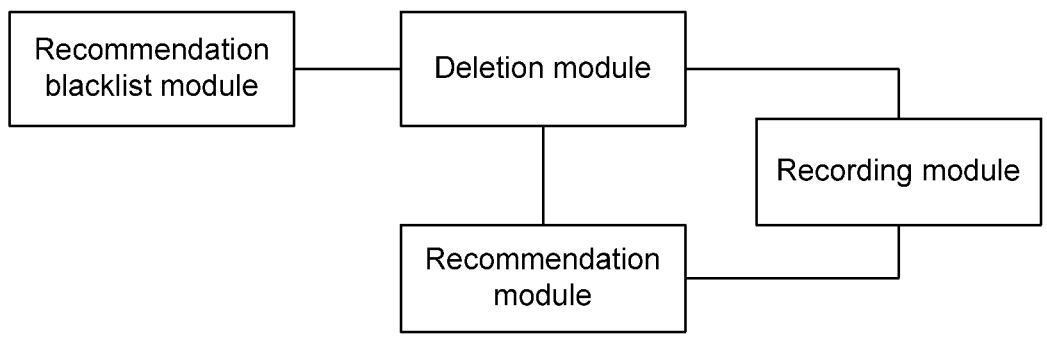

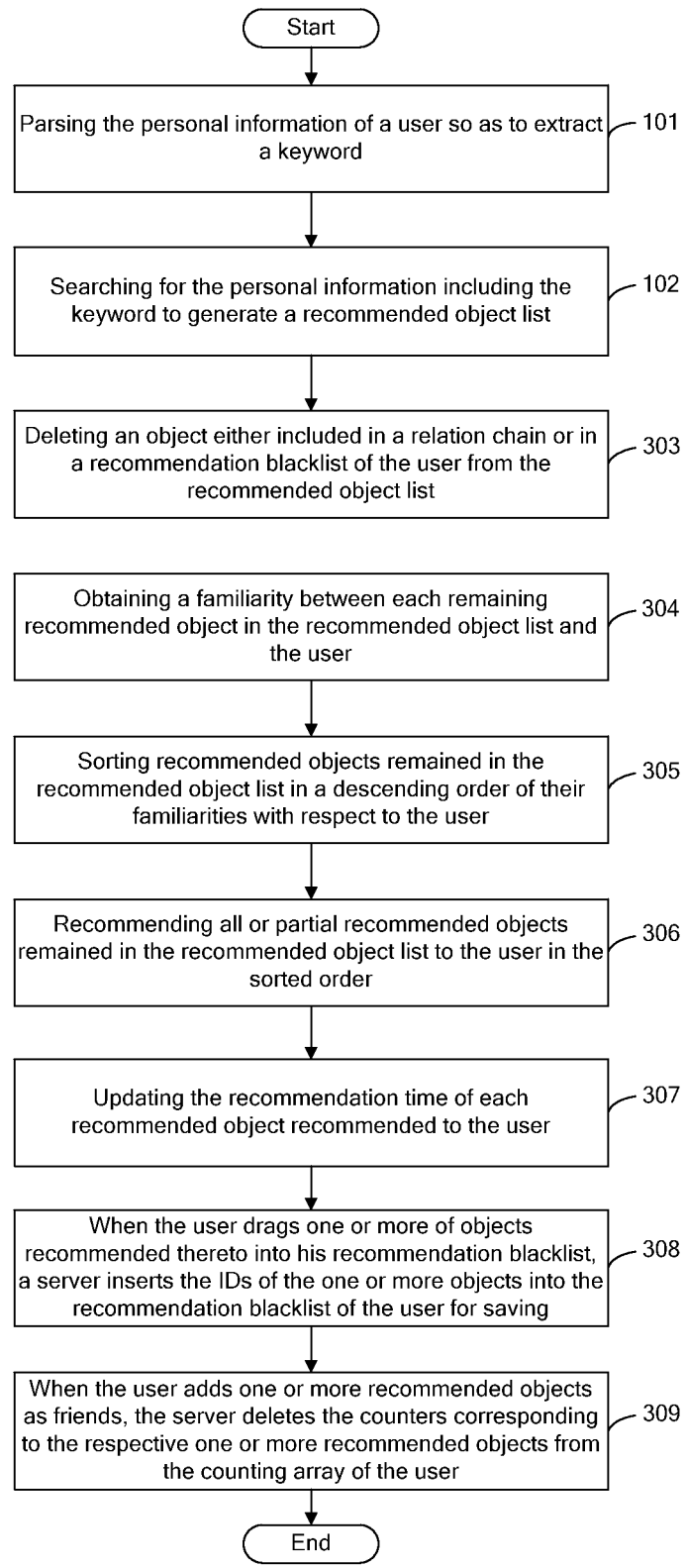

FRIEND RECOMMENDATION METHOD, APPARATUS AND STORAGE MEDIUM

CROSS REFERENCE TO RELATED APPLICATIONS

This is a continuation application of International Patent Application No.: PCT/CN2012/076861, filed on Jun. 13, 2012, which claims priority to Chinese Patent Application No.: 201110278327.1, filed on Sep. 19, 2011, the disclosure of which is incorporated by reference herein in its entirety.

TECHNICAL FIELD

The disclosure relates to the field of social network, and in particular to a friend recommendation method and a friend recommendation apparatus.

BACKGROUND

With the popularization of social network, such as network platform, micro blog and alumni book for instant messaging, more and more people find friends over the network. To enable a user to create a relation chain on his network platform, each social network may recommend friends to him.

Generally, the current friend recommendation method is to estimate a familiarity between a user and each recommended object, and to recommend an object with a high familiarity to the user. The recommended object may be other users. However, for a recommended object who has been recommended for many times but is always not added by the user as a friend, he/she may be recommended repeatedly all the time, which lowers the efficiency of friend recommendation method and deteriorates user experience, thus arousing the resentment of the user and even causing the loss of network users.

SUMMARY

In view of this, the embodiments of the disclosure provide a friend recommendation method and a friend recommendation apparatus, which can adjust a recommended friend object in real time to improve the effectiveness and accuracy of friend recommendation, thereby enhancing user experience.

In an example, the present disclosure provides a friend recommendation method, including:
creating a recommendation backlist for a user;
during friend recommendation, deleting a recommended object included in the recommendation backlist of the user from a recommended object list; and
recommending remaining recommended objects in the recommended object list to the user.

In an example, the deleting a recommended object included in the recommendation backlist of the user from a recommended object list may include:
comparing an ID of each recommended object in the recommended object list with each user ID saved in the recommendation backlist of the user; and
when an ID of a recommended object is identical to a user ID in the recommendation backlist of the user, deleting the ID of the recommended object from the recommended object list.

In an example, the recommending remaining recommended objects in the recommended object list to the user may include:
obtaining a familiarity between each remaining recommended object and the user based on personal information and a recommendation time of each remaining recommended object in the recommended object list;
sorting the remaining recommended objects based on their familiarities; and
recommending all or partial recommended objects remained in the recommended object list to the user in the sorted order.

In an example, the method may further include:
recording a recommendation time of each recommended object recommended to the user; and
obtaining the recommendation time of each recommended object recommended to the user before the remaining recommended objects in the recommended object list are recommended to the user.

In an example, the recording a recommendation time of each recommended object recommended to the user may include:
creating a counting array for the user, wherein the counting array comprises one or more counters each saving an ID and a recommendation time of one recommended object,
wherein when a recommended object is recommended to the user for one time, the counter saving an ID of the recommended object in the counting array of the user adds 1 to the saved recommendation time.

In an example, the method may further include: after the user adds a recommended object as a friend, deleting the counter corresponding to the recommended object from the counting array of the user.

In an example, the method may further include: when the user drags a recommended object into his recommendation blacklist, inserting an ID of the recommended object to the recommendation blacklist of the user for saving.

In an example, the method may further include: setting a blacklist function key for dragging a recommended object into the recommendation blacklist,
wherein the process that the user drags a recommended object into his recommendation blacklist comprises: the user selects a recommended object to be dragged into his recommendation blacklist and then clicks the blacklist function key.

In an example, the method may further include: before the remaining recommended objects in the recommended object list are recommended to the user, deleting a recommended object included in a relation chain of the user from the recommended object list.

In an example, the present disclosure provides server, including a recommendation blacklist module, a deletion module and a recommendation module,
wherein the recommendation blacklist module is configured to create a recommendation blacklist for a user;
wherein the deletion module is configured to, during friend recommendation, delete a recommended object included in the recommendation blacklist of the user from a recommended object list; and
wherein the recommendation module is configured to recommend remaining recommended objects in the recommended object list to the user.

In an example, the deletion module may be configured to compare an ID of each recommended object in the recommended object list with each user ID saved in the recommendation blacklist of the user, and when an ID of a recommended object is identical to a user ID in the recommendation blacklist of the user, to delete the ID of the recommended object from the recommended object list.

In an example, the recommendation module may be configured to:

obtain a familiarity between each remaining recommended object and the user based on personal information and a recommendation time of each remaining recommended object in the recommended object list;

sort the remaining recommended objects based on their respective familiarities; and recommend all or partial recommended objects in the recommended object list to the user in the sorted order.

In an example, the server may further include: a recording module configured to record a recommendation time of each recommended object recommended to the user, wherein the recommendation module is further configured to obtain the recommendation time of each recommended object recommended to the user from the recording module before recommending the remaining recommended objects in the recommended object list to the user.

In an example, the recording module may be configured to create a counting array for the user, wherein the counting array comprises one or more counters each saving an ID and a recommendation time of one recommended object, wherein when a recommended object is recommended to the user for one time, the counter saving an ID of the recommended object in the counting array of the user adds 1 to the saved recommendation time.

In an example, the deletion module may be further configured to, after the user adds a recommended object as a friend, delete the counter corresponding to the recommended object from the counting array of the user in the recording module.

In an example, the recommendation blacklist module may be further configured to, when the user drags a recommended object into his recommendation blacklist, insert an ID of the recommended object to the recommendation blacklist of the user for saving.

In an example, the deletion module may be further configured to delete a recommended object included in a relation chain of the user from the recommended object list before the recommendation module recommends the remaining recommended objects in the recommended object list to the user.

In an example, the present disclosure provides one or more storage mediums including computer executable instructions, wherein the computer executable instructions are used for executing a friend recommendation method, comprising:

creating a recommendation blacklist for a user;

during friend recommendation, deleting a recommended object included in the recommendation blacklist of the user from a recommended object list; and recommending remaining recommended objects in the recommended object list to the user.

According to the friend recommendation method and friend recommendation apparatus provided by the disclosure, the recommendation blacklist is created for each user and a recommended object that the user does not want to add as his/her friend is deleted from the recommended object list before the friend recommendation, so as to recommend friends based on the requirements of the user and recommend an object that the user is really interested in. Therefore, the accuracy and efficiency of friend recommendation are improved and friends are recommended effectively.

Furthermore, in the disclosure, the recommendation time of a recommended object is recorded in order to adjust the familiarity between the recommended object and the user based on the recommendation time. Specifically, when a recommended object is recommended for many times but is never added as a friend by the user, the familiarity of the recommended object is reduced, and therefore, the object that the user is really interested in can be recommended more effectively, and accordingly, the accuracy and efficiency of friend recommendation are improved and friends are recommended effectively.

BRIEF DESCRIPTION OF THE DRAWINGS

FIG. 1 is a flowchart showing the implementation of a friend recommendation method according to an embodiment of the disclosure;

FIG. 2 is a diagram showing the structure of a server performing recommendation according to an embodiment of the disclosure; and FIG. 3 is a flowchart showing the implementation process of friend recommendation according to a first embodiment of the disclosure.

DETAILED DESCRIPTION

In the embodiments of the disclosure, a recommendation blacklist is created for each user. During friend recommendation, a recommended object included in the recommendation blacklist is filtered out from a recommended object list at first and then the remaining recommended objects are recommended to a user. As such, the friend recommendation can be set according to the requirement of the user. Therefore, the effectiveness and accuracy of friend recommendation are improved and the user experience is enhanced.

As shown in FIG. 1, the friend recommendation method mainly includes the following steps:

Step 101: a recommendation blacklist is created for each user; and

Step 102: during friend recommendation, a recommended object included in the recommendation blacklist of a user is deleted from a recommended object list and remaining recommended objects in the recommended object list are recommended to the user.

In an example, the ID of each recommended object in the recommended object list is compared with each ID saved in the recommendation blacklist of the user respectively, and when the ID of a recommended object is identical to one ID in the recommendation blacklist of the user, the ID of the recommended object is deleted from the recommended object list.

In an example, the recommended object already included in a relation chain of the user may be deleted from the recommended object list. Specifically, through the related conventional art or through a method similar to that of deleting an object from the recommendation blacklist, the recommended object included in the relation chain of the user may be deleted from the recommended object list.

In an example, the process that the remaining recommended objects in the recommended object list are recommended to the user includes: a familiarity between each remaining recommended object and the user is obtained based on the personal information and a recommendation time of each remaining recommended object in the recommended object list; recommended objects are sorted based on their respective familiarities; and all or partial recommended objects in the recommended object list are recommended to the user in the sorted order.

In an example, a familiarity factor may be set to correspond to the personal information and a familiarity factor may be set to correspond to the recommendation time. The familiarity factor corresponding to the recommendation time is inversely proportional to the recommendation time. Specifically, one may first obtain a familiarity factor corresponding to the personal information of a recommended object and a familiarity factor corresponding to the recommendation time of the recommended object; and then obtain a familiarity based on familiarity factors. As such, for a recommended object, the higher the recommendation time is, the lower the familiarity is.

In an example, the method may further include: the time of recommending each recommended object to a user is recorded; and the time of recommending each recommended object to the user is obtained before the remaining recommended objects in the recommended object list are recommended to the user.

In an example, a counting array is created for each user, wherein the counting array includes one or more counters each saving the ID and the recommendation time of one recommended object. When a recommended object is recommended to a user for one time, the counter saving the ID of the recommended object in the counting array of the user will add 1 to the saved recommendation time.

In an example, the method may further include: after the user adds the recommended object as his/her friend, the counter corresponding to the recommended object is deleted from the counting array of the user.

In an example, the method may further include: when the user drags a recommended object in his recommendation blacklist, the ID of the recommended object is inserted to and saved in the recommendation blacklist of the user. A blacklist function key for dragging the recommended object into the recommendation blacklist may be set; and the user may drag the recommended object into his recommendation blacklist by selecting an recommended object to be dragged in the recommendation blacklist and then clicking the blacklist function key.

Correspondingly, the disclosure further provides a server for friend recommendation. As shown in FIG. 2, the server includes: a recommendation blacklist module, a deletion module and a recommendation module. The recommendation blacklist module is configured to create a recommendation blacklist for each user. The deletion module is configured, during friend recommendation, to delete a recommended object included in the recommendation blacklist of a user from a recommended object list. The recommendation module is configured to recommend remaining recommended objects in the recommended object list to the user.

In an example, the deletion module is configured to compare an ID of each recommended object in the recommended object list with each user ID saved in the recommendation blacklist of the user, and when an ID of a recommended object is identical to a user ID in the recommendation blacklist of the user, to delete the ID of the recommended object from the recommended object list.

In an example, the recommendation module is configured to:
obtain a familiarity between each remaining recommended object and the user based on personal information and a recommendation time of each remaining recommended object in the recommended object list;
sort the remaining recommended objects based on their respective familiarities; and
recommend all or partial recommended objects in the recommended object list to the user in the sorted order.

In an example, the server further includes a recording module configured to record a recommendation time of each recommended object recommended to the user,
wherein the recommendation module is further configured to obtain the recommendation time of each recommended object recommended to the user from the recording module before recommending the remaining recommended objects in the recommended object list to the user.

In an example, the recording module is configured to create a counting array for a user, wherein the counting array comprises one or more counters each saving an ID and a recommendation time of one recommended object,
wherein when a recommended object is recommended to the user for one time, the counter saving an ID of the recommended object in the counting array of the user adds 1 to the saved recommendation time.

In an example, the deletion module is further configured to, after the user adds a recommended object as a friend, delete the counter corresponding to the recommended object from the counting array of the user in the recording module.

In an example, the recommendation blacklist module is further configured to, when the user drags a recommended object into the recommendation blacklist, insert an ID of the recommended object to the recommendation blacklist of the user for saving.

In an example, the deletion module is further configured to delete a recommended object included in a relation chain of the user from the recommended object list before the recommendation module recommends the remaining recommended objects in the recommended object list to the user.

First Embodiment

As shown in FIG. 3, in an embodiment, the friend recommendation process mainly includes the following steps.

Step 301: the personal information of a user is parsed, so that a keyword can be extracted from the personal information.

The personal information may include the registration information of the user in a server performing recommendation, such as ID, age, school, class, working place, hometown, schoolfellow and friends of the user.

In the actual practice, a user may register his personal information in the server when he registers with the server. The server may save the registered personal information of the user, so that in case of friend recommendation, the personal information of the user may be found according to the ID of the user and to be parsed.

The keyword may be set according to actual needs and may be one or more. And generally, multiple keywords are set. For example, for the network community of alumni, school, class and the like of the user may be set as the keyword. If the user is in class YYY of school XXX, "XXX" and "YYY" are extracted from the personal information of the user to be used as the keywords.

Step 302: the personal information including the keyword is searched for, and a recommended object list is generated.

Specifically, the server parses the personal information of all the users saved therein, searches for the personal information including the keyword, and takes the users with the searched personal information as recommended objects to generate a recommended object list including the ID of each recommended object.

In an example, when there is a plurality of keywords, personal information including one or more of the plurality of keywords is searched for.

Step 303: an object included either in a relation chain or in a recommendation blacklist of the user is deleted from the recommended object list.

In an example, a recommendation blacklist, which saves IDs of objects, is created for each user at the server.

In an example, the recommendation blacklist of the user is queried and the ID of each recommended object in the recommended object list is compared with the IDs saved in the recommendation blacklist. If an ID of a recommended object in the recommended object list is identical to an ID in the recommendation blacklist, the recommended object is deleted. If they are not identical, the recommended object is remained. Similarly, the recommended object already in the relation chain of the user is deleted.

Step 304: for each remaining recommended object in the recommended object list, its familiarity factor with respect to the user is obtained based on his personal information and the time of being recommended to the user, and its familiarity with respect to the user is calculated based on to the familiarity factor.

In an example, corresponding to the personal information, there may be set one or more familiarity factors. The familiarity factors may be set based on keywords. Each keyword corresponds to one familiarity factor and may be, as required, an integer greater than 0. When the personal information of a recommended object includes a keyword, the familiarity factor corresponding to the keyword is a set value; and when the personal information of the recommended object does not include the keyword, the familiarity factor corresponding to the keyword is 0.

For example, in a network community for alumni, the familiarity fraction of a familiarity factor corresponding to the keyword "school" is set to maximum, such as 20. When the keyword "school" included in the personal information of a recommended object is consistent with that of the user, the familiarity factor corresponding to the keyword "school" is 20, otherwise, it is 0. For example, in the network community for alumni, the familiarity fraction of a familiarity factor corresponding to the keyword "hometown" is set to a low value, such as 5. When the keyword "hometown" included in the personal information of a recommended object is consistent with that of the user, the familiarity factor corresponding to the keyword "hometown" is 5, otherwise, it is 0.

In addition, a familiarity factor corresponding to the recommendation time is also set and is set to be inversely proportional to the recommendation time. Thus, the higher the recommendation time is, the lower the corresponding familiarity factor is. And accordingly, when a recommended object is recommended for many times but is always not added as a friend, its familiarity is lowered. The specific algorithm for the familiarity factor associated with the recommendation time may be set according to actual requirements. For example, respective fixed familiarity factors are set for different recommendation times. For example, when the recommendation time is 1, 2, 3 and 4, the values of corresponding familiarity factors are −10, −20, −30 and −40 respectively. In an example, the relation between the value of the familiarity factor and the recommendation time is set as a weighted relation. When the recommendation time increases, the value of the familiarity factor will decrease in an exponential relation along with the increase of the recommendation time.

In an example, each familiarity factor corresponding to the personal information and the familiarity factor corresponding to the recommendation time are integrated to obtain the familiarity. For example, the sum of each familiarity factor is regarded as the familiarity.

Step 305: recommended objects remained in the recommended object list are sorted in a descending order of their familiarities with respect to the user.

Step 306: all or partial recommended objects remained in the recommended object list are recommended to the user in the sorted order.

Here, the first N recommended objects in the recommended object list may be recommended to the user, where N is an integer no less than 1 and may be set according to actual requirements.

Step 307: the recommendation time of each recommended object is updated.

In an example, at a server performing recommendation, a counting array for recording the recommendation time of each recommended object is set for a user. The counting array includes a plurality of counters each saving the ID and the recommendation time of one recommended object. When a recommended object is recommended to a user for one time, 1 is added to the recommendation time of the counter saving the ID of the recommender object in the counting array. For a new registered user, the server may create a counting array for the new registered user during his registration.

In Step 304, the server may query the counting array of a user to query the corresponding counter of a recommended object according to the ID of the recommended object so as to read the recommendation time of the recommended object from the corresponding counter. In Step 304, if the server finds there is no counter in the counting array of a user corresponding to a recommended object, the recommendation time of the recommended object defaults to 0, and a counter is created in the counting array of the user for the recommended object, with the initial value of the recommendation time being 0 in the counter.

Step 308: when the user drags one or more of objects recommended thereto into his recommendation blacklist, a server inserts the IDs of the one or more objects into the recommendation blacklist of the user for saving, updating the recommendation blacklist of the user.

In an example, a blacklist function key "X" for blacklisting an object is set on a friend recommendation interface of the community. The user selects a recommended object to be dragged into his recommendation blacklist and clicks the blacklist function key "X" on the friend recommendation interface, and the server inserts the ID of the recommended object into the recommendation blacklist of the user for saving and thus updates the recommendation blacklist of the user, thereby completing the blacklisting operation associated with the recommended object.

Step 309: when the user adds one or more recommended objects as friends, the server deletes the counters corresponding to the respective one or more recommended objects from the counting array of the user, updating the counting array of the user.

Those skilled in the art may understand that the implementation of all or some process in the method embodiments above may be achieved via instructing a related hardware by computer executable instructions. The computer executable instructions may be stored in a computer readable storage medium. When executed, the computer executable instructions may include the process in each method embodiment above. The storage medium may be diskette, compact disc, read-only memory (ROM) or random access memory (RMA), etc.

What discussed above are only preferred embodiments of the disclosure, and not intended to limit the scope of protection of the disclosure.

The invention claimed is:

1. A friend recommendation method, comprising:
creating, by a server, a recommendation blacklist for a terminal;
during friend recommendation, deleting, by the server, a recommended object included in the recommendation blacklist from a recommended object list; and
recommending, by the server, remaining recommended objects in the recommended object list to the terminal,
in response to an operation of adding the recommended objects as friends from the terminal, deleting, by the server, a counter corresponding to the recommended objects from a counting array of the terminal:
wherein the recommending, by the server, remaining recommended objects in the recommended object list to the terminal comprises:
obtaining, by the server, a familiarity between each remaining recommended object and a user using the terminal currently based on personal information and a recommendation time of each remaining recommended object in the recommended object list;
sorting, by the server, the remaining recommended objects based on their familiarities; and
recommending, by the server, all or partial recommended objects remained in the recommended object list to the terminal in the sorted order.

2. A server, comprising a recommendation blacklist module, a deletion module and a recommendation module,
wherein the recommendation blacklist module is configured to create a recommendation blacklist for a terminal;
wherein the deletion module is configured to, during friend recommendation, delete a recommended object included in the recommendation blacklist from a recommended object list; and
wherein the recommendation module is configured to recommend remaining recommended objects in the recommended object list to the terminal,
wherein the deletion module is further configured to:
in response to an operation of adding the recommended objects as friends from the terminal, delete a counter corresponding to the recommended objects from a counting array of the terminal:
wherein the recommendation module is further configured to:
obtain a familiarity between each remaining recommended object and a user using the terminal currently based on personal information and a recommendation time of each remaining recommended object in the recommended object list;
sort the remaining recommended objects based on their respective familiarities; and
recommend all or partial recommended objects in the recommended object list to the terminal in the sorted order.

3. One or more non-transitory storage mediums comprising computer executable instructions, wherein the computer executable instructions are used for executing a friend recommendation method, comprising:
Creating, by the server, a recommendation blacklist for a terminal;
during friend recommendation, deleting, by the server, a recommended object included in the recommendation blacklist from a recommended object list; and
recommending, by the server, remaining recommended objects in the recommended object list to the terminal,
in response to an operation of adding the recommended objects as friends from the terminal, deleting, by the server, a counter corresponding to the recommended objects from a counting array of the terminal:
wherein the recommending remaining recommended objects in the recommended object list to the terminal comprises:
obtaining, by the server, a familiarity between each remaining recommended object and a user using the terminal currently based on personal information and a recommendation time of each remaining recommended object in the recommended object list;
sorting, by the server, the remaining recommended objects based on their familiarities; and
recommending, by the server, all or partial recommended objects remained in the recommended object list to the terminal in the sorted order.

4. The friend recommendation method according to claim 1, wherein the deleting, by the server, a recommended object included in the recommendation blacklist from a recommended object list comprises:
comparing, by the server, an ID of each recommended object in the recommended object list with each user ID saved in the recommendation blacklist; and
when an ID of a recommended object is identical to a user ID in the recommendation blacklist, deleting the ID of the recommended object from the recommended object list.

5. The friend recommendation method according to claim 1, further comprising:
recording, by the server, a recommendation time of each recommended object recommended to the terminal; and
obtaining, by the server, the recommendation time of each recommended object recommended to the terminal before the remaining recommended objects in the recommended object list are recommended to the terminal.

6. The friend recommendation method according to claim 1, further comprising: when the terminal drags a recommended object into the recommendation blacklist, inserting, by the server, an ID of the recommended object to the recommendation blacklist of the terminal for saving.

7. The friend recommendation method according to claim 1 further comprising: before the remaining recommended objects in the recommended object list are recommended to the terminal, deleting, by the server, a recommended object included in a relation chain of the user using the terminal currently from the recommended object list.

8. The server according to claim 2, wherein the deletion module is configured to compare an ID of each recommended object in the recommended object list with each user ID saved in the recommendation blacklist, and when an ID of a recommended object is identical to a user ID in the recommendation blacklist, to delete the ID of the recommended object from the recommended object list.

9. The server according to claim 2, further comprising: a recording module configured to record a recommendation time of each recommended object recommended to the terminal,
wherein the recommendation module is further configured to obtain the recommendation time of each recommended object recommended to the terminal from the recording module before recommending the remaining recommended objects in the recommended object list to the terminal.

10. The server according to claim 2, wherein the recommendation blacklist module is further configured to, when the terminal drags a recommended object into the recommendation blacklist, insert an ID of the recommended object to the recommendation blacklist of the terminal for saving.

11. The server according to claim 2, wherein the deletion module is further configured to delete a recommended object included in a relation chain of the user using the terminal currently from the recommended object list before the recommendation module recommends the remaining recommended objects in the recommended object list to the terminal.

12. The friend recommendation method according to claim 5, wherein the recording, by the server, a recommendation time of each recommended object recommended to the terminal comprises:
 creating, by the server, a counting array for the terminal, wherein the counting array comprises one or more counters each saving an ID and a recommendation time of one recommended object,
 wherein when a recommended object is recommended to the terminal for one time, the counter saving an ID of the recommended object in the counting array of the terminal adds 1 to the saved recommendation time.

13. The friend recommendation method according to claim 6, further comprising:
 setting, by the server, a blacklist function key for dragging a recommended object into the recommendation blacklist,
 wherein the process that the terminal drags a recommended object into the recommendation blacklist comprises: the user using the terminal currently selects a recommended object to be dragged into the recommendation blacklist and then clicks the blacklist function key.

14. The server according to claim 9, wherein the recording module is configured to create a counting array for the terminal, wherein the counting array comprises one or more counters each saving an ID and a recommendation time of one recommended object,
 wherein when a recommended object is recommended to the terminal for one time, the counter saving an ID of the recommended object in the counting array of the terminal adds 1 to the saved recommendation time.

* * * * *